United States Patent
Tominaga (10) Patent No.: US 8,886,032 B2
(45) Date of Patent: Nov. 11, 2014

(54) WAVELENGTH MULTIPLEXING OPTICAL TRANSMISSION SYSTEM, TRANSMITTER, AND RECEIVER

(75) Inventor: Shigeo Tominaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 13/878,467

(22) PCT Filed: Sep. 30, 2011

(86) PCT No.: PCT/JP2011/005552
§ 371 (c)(1), (2), (4) Date: Apr. 9, 2013

(87) PCT Pub. No.: WO2012/073419
PCT Pub. Date: Jun. 7, 2012

(65) Prior Publication Data
US 2013/0195440 A1    Aug. 1, 2013

(30) Foreign Application Priority Data

Nov. 29, 2010    (JP) ................................ 2010-264865

(51) Int. Cl.
  *H04B 14/02*    (2006.01)
  *H04J 14/02*    (2006.01)
  *H04B 10/038*    (2013.01)

(52) U.S. Cl.
  CPC .......... *H04B 10/038* (2013.01); *H04J 14/0297* (2013.01); *H04J 14/0295* (2013.01); *H04J 14/0275* (2013.01)
  USPC .............................................. 398/7; 398/91

(58) Field of Classification Search
  CPC . H04B 10/506; H04J 14/0295; H04J 14/0297
  USPC ........................................................ 398/7, 91
  See application file for complete search history.

(56) References Cited

U.S. PATENT DOCUMENTS

| | | | |
|---|---|---|---|
| 5,777,761 A * | 7/1998 | Fee ................................... | 398/7 |
| 6,081,359 A | 6/2000 | Takehana et al. | |
| 6,915,075 B1 * | 7/2005 | Oberg et al. ...................... | 398/9 |
| 7,233,738 B2 * | 6/2007 | Kerfoot, III ...................... | 398/10 |

(Continued)

FOREIGN PATENT DOCUMENTS

| | | |
|---|---|---|
| JP | 10 210008 | 8/1998 |
| JP | 2000 232412 | 8/2000 |
| JP | 2001-230759 A | 8/2001 |

(Continued)

OTHER PUBLICATIONS

Japanese Office Action Issued May 21, 2013 in Patent Application No. 2012-546672 (with English translation).
International Search Report Issued Dec. 6, 2011 in PCT/JP11/05552 Filed Sep. 30, 2011.

*Primary Examiner* — Leslie Pascal
(74) *Attorney, Agent, or Firm* — Oblon, Spivak, McClelland, Maier & Neustadt, L.L.P.

(57) ABSTRACT

When a failure occurs in operational transmission multiplexing transponders 6-1 to 6-N, a wavelength multiplexing optical transmission system carries out selection switching control on N×1 optical switches 5-1 to 5-*m* and (N+1)×N optical switches 11-1 to 11-*m* to transmit a wavelength-multiplexed light signal by using reserve transmission and reception multiplexing transponders 6-R and 10-R, thereby sidestepping the failure.

11 Claims, 6 Drawing Sheets

(56) References Cited

U.S. PATENT DOCUMENTS

| | | |
|---|---|---|
| 7,613,392 B2 * | 11/2009 | Gerstel .......................... 398/5 |
| 8,693,864 B2 * | 4/2014 | Kubo et al. ..................... 398/7 |
| 2003/0147585 A1 | 8/2003 | Kikuchi et al. |
| 2011/0158648 A1 | 6/2011 | Kubo et al. |
| 2011/0311217 A1 | 12/2011 | Horiuchi et al. |

FOREIGN PATENT DOCUMENTS

| | | |
|---|---|---|
| WO | WO 2010/044154 A1 | 4/2010 |
| WO | WO 2010/100793 A1 | 9/2010 |

\* cited by examiner

WAVELENGTH MULTIPLEXING OPTICAL TRANSMISSION SYSTEM, TRANSMITTER, AND RECEIVER

FIELD OF THE INVENTION

The present invention is applied to a transmission system for optical communications which use a wavelength multiplexing method, and relates to a wavelength multiplexing optical transmission system which improves its reliability at the time that a failure occurs therein, and a transmitter and a receiver.

BACKGROUND OF THE INVENTION

There has been disclosed a conventional wavelength multiplexing optical transmission system which, in addition to operational transmission and reception transponders which are used for normal signal transmission, includes reserve transmission and reception transponders which construct a reserve transmission line when a failure occurs in this operational transmission transponder (for example, refer to patent reference 1). Because even when a failure occurs in an operational transmission transponder, the conventional wavelength multiplexing optical transmission system can thus transmit the same signal by using the reserve transponders, instead of this operational transmission transponder, the failure can be sidestepped and the signal transmission can be ensured.

RELATED ART DOCUMENT

Patent Reference

Patent reference 1: Japanese Unexamined Patent Application Publication No. Hei 10-210008

SUMMARY OF THE INVENTION

Problems to be Solved by the Invention

On the other hand, there is a case in which a multiplexing transponder for accommodating a plurality of signals by using a single transponder is used as the speed of the transmission line is increased and the speed of the input/output signals is made to have many variations. More specifically, there is a case in which a transmission multiplexing transponder for multiplexing m input signals into a single signal to carry out wavelength conversion on this signal is used as a transmission transponder. Similarly, there is a case in which a reception multiplexing transponder for demultiplexing a signal received from a transmission line into m signals to carry out wavelength conversion on each of these signals is used as a reception transponder. For example, there is a case in which a transmit side accommodates four 10-Gbps signals into a signal by using a single transmission multiplexing transponder, and sends out this signal to a transmission line as a 40-Gbps signal, and a reception multiplexing transponder of a receive side demultiplexes the 40-Gbps signal received from the transmission line into the four 10-Gbps signals, and outputs these signals. A problem is, however, that the conventional wavelength light multiplexing transmission device disclosed by patent reference 1 does not support sidestepping failure in the case of using a multiplexing transponder that accommodates a plurality of signals by using a single transponder.

The present invention is made in order to solve the above-mentioned problems, and it is therefore an object of the present invention to provide a wavelength multiplexing optical transmission system that can sidestep a failure even when using a multiplexing transponder that accommodates a plurality of signals by using a single transponder, and a transmitter and a receiver.

Means for Solving the Problem

In accordance with the present invention, there is provided a wavelength multiplexing optical transmission system including a transmitter for multiplexing a predetermined number of light signals into wavelength-multiplexed light and carrying out wavelength conversion on the wavelength-multiplexed light, and a receiver for demultiplexing the wavelength-multiplexed light from the transmitter into the predetermined number of light signals, in which the transmitter includes: a plurality of operational transmission multiplexing transponders each for multiplexing a predetermined number of light signals inputted thereto into a light signal and converting this light signal into a light signal having a specific wavelength; an input selecting unit for selecting one light signal from light signals respectively inputted to each group of corresponding input ports of the plurality of operational transmission multiplexing transponders as output light thereof; a reserve transmission multiplexing transponder for multiplexing light signals selected by the input selecting unit into a light signal and converting this light signal into a light signal having a wavelength different from those of light signals from the plurality of operational transmission multiplexing transponders; a wavelength multiplexing unit for wavelength-multiplexing the multiplexed light signals having different wavelengths which are generated by the plurality of operational transmission multiplexing transponders and the reserve transmission multiplexing transponder into a wavelength multiplexed light signal, and outputting this wavelength multiplexed light signal to the receiver; a transmit side supervisory control unit having a failure detecting unit for detecting a failure occurring in the plurality of operational transmission multiplexing transponders, and a switching control unit for carrying out selection switching control on the input selecting unit according to a result of the failure detection by the failure detecting unit; and a supervisory control signal output unit for outputting a signal showing a supervisory control state of the transmit side supervisory control unit to the receiver, and the receiver includes: a wavelength demultiplexing unit for demultiplexing the wavelength multiplexed light from the wavelength multiplexing unit into light signals having different wavelengths; a plurality of operational reception multiplexing transponders each for demultiplexing a corresponding one of the light signals into which the wavelength multiplexed light is demultiplexed by the wavelength demultiplexing unit into a predetermined number of light signals; a reserve reception multiplexing transponder for demultiplexing a corresponding one of the light signals into which the wavelength multiplexed light is demultiplexed by the wavelength demultiplexing unit into a predetermined number of light signals; an output selecting unit for selecting a light signal from each group of light signals which are respectively demultiplexed by each of the plurality of operational reception multiplexing transponders and the reserve reception multiplexing transponder as output light thereof; a supervisory control signal detecting unit for detecting the supervisory control signal from the supervisory control signal output unit; and a receive side supervisory control unit for carrying out selection switching control on the output selecting unit according to the supervisory control signal detected by the supervisory control signal detection unit.

Advantages of the Invention

Because the wavelength multiplexing optical transmission system in accordance with the present invention is constructed as above, the wavelength multiplexing optical transmission system can sidestep a failure and ensure the signal transmission even when using a multiplexing transponder that accommodates a plurality of signals with a single transponder.

EMBODIMENTS OF THE INVENTION

Hereafter, the preferred embodiments of the present invention will be explained in detail with reference to the drawings.
Embodiment 1.

Figure 1:
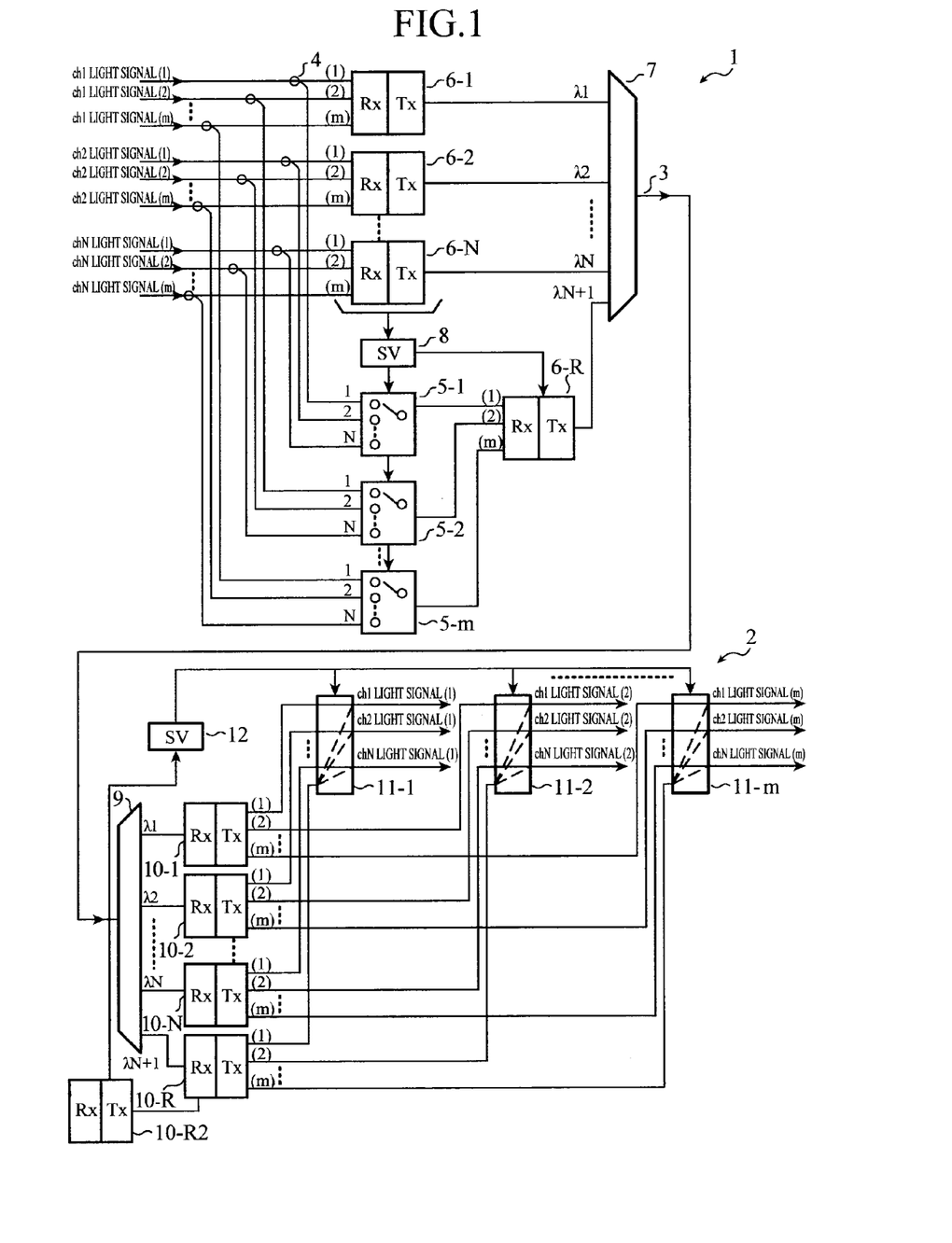
FIG. 1 is a diagram showing the structure of a wavelength multiplexing optical transmission system in accordance with Embodiment 1 of the present invention.

FIG. 1 is a diagram showing the structure of a wavelength multiplexing optical transmission system in accordance with Embodiment 1 of the present invention. As shown in FIG. 1, the wavelength multiplexing optical transmission system is comprised of a transmitter 1 for multiplexing a predetermined number (m) of light signals into wavelength multiplexed light and carrying out wavelength conversion on this wavelength multiplexed light, a receiver 2 for demultiplexing the wavelength multiplexed light from the transmitter 1 into the predetermined number (m) of light signals, and carrying out wavelength conversion on these light signals, and a transmission line 3 for connecting between the transmitter 1 and the receiver 2.

The transmitter 1 is comprised of optical couplers 4, N×1 optical switches (input selecting unit) 5-1 to 5-*m*, transmission multiplexing transponders 6-1 to 6-N and 6-R, a wavelength multiplexing unit 7, and a transmit side supervisory control unit (SV) 8, as shown in FIG. 1.

Each of the optical couplers 4 is disposed in a corresponding input signal line connected to a corresponding one of the transmission multiplexing transponders 6-1 to 6-N, and divides a light signal inputted to the corresponding one of the transmission multiplexing transponders 6-1 to 6-N into two light signals. While one of the two light signals into which the original light signal is divided by this optical coupler 4 is outputted to the corresponding one of the transmission multiplexing transponders 6-1 to 6-N, the other one of the two light signals is outputted to a corresponding one of the N×1 optical switches 5-1 to 5-*m*.

Each of the N×1 optical switches 5-1 to 5-*m* selects one light signal from N light signals from corresponding optical couplers 4 according to control by the transmit side supervisory control unit 8 as single output light thereof. The same light signals as a light signal (1) inputted to the transmission multiplexing transponder 6-1, a light signal (1) inputted to the transmission multiplexing transponder 6-2, . . . , and a light signal (1) inputted to the transmission multiplexing transponder 6-N are inputted to the N×1 optical switch 5-1. More specifically, one of light signals into which the light signal inputted to the 1st input port of each of the transmission multiplexing transponders 6-1 to 6-N is made to branch off is inputted to the N×1 optical switch 5-1. Similarly, one of light signals into which a light signal inputted to the mth input port of each of the transmission multiplexing transponders 6-1 to 6-N is made to branch off is inputted to the N×1 optical switch 5-*m*. A light signal selected by each of these N×1 optical switches 5-1 to 5-*m* is outputted to the transmission multiplexing transponder 6-R.

The transmission multiplexing transponders 6-1 to 6-N multiplex the groups of the m light signals from the corresponding optical couplers 4 into single light signals and convert these signals light signals into light signals having specific wavelengths $\lambda 1$ to $\lambda N$, respectively. Further, the transmission multiplexing transponder 6-R multiplexes the m light signals from the N×1 optical switches 5-1 to 5-*m* into a single light signal, and converts this light signal into a light signal having a wavelength $\lambda N+1$. The transmission multiplexing transponder 6-R also multiplexes a supervisory control signal showing the supervisory control state of the transmit side supervisory control unit 8 into the light signal having the wavelength $\lambda N+1$. This transmission multiplexing transponder 6-R also corresponds to a supervisory control signal output unit shown in the claimed invention. In this embodiment, the transmission multiplexing transponders 6-1 to 6-N which use the wavelengths $\lambda 1$ to $\lambda N$ are operational transmission multiplexing transponders for use in normal signal transmission. On the other hand, the transmission multiplexing transponder 6-R which uses the wavelength $\lambda N+1$ is a reserve transmission multiplexing transponder which constructs a reserve transmission line when a failure occurs in the signal transmission using the wavelengths $\lambda 1$ to $\lambda N$. The light signals having the wavelengths $\lambda 1$ to $\lambda N$ and $\lambda N+1$ into each of which the corresponding light signals are multiplexed by the corresponding one of these transmission multiplexing transponders 6-1 to 6-N and 6-R are outputted to the wavelength multiplexing unit 7.

The wavelength multiplexing unit 7 wavelength-multiplexes the light signals having the wavelengths $\lambda 1$ to $\lambda N$ and $\lambda N+1$ from the transmission multiplexing transponders 6-1 to 6-N and 6-R into wavelength multiplexed light. This wavelength multiplexed light into which the light signals are wavelength-multiplexed by the wavelength multiplexing unit 7 is sent out to the receiver 2 via the transmission line 3.

Figure 2:
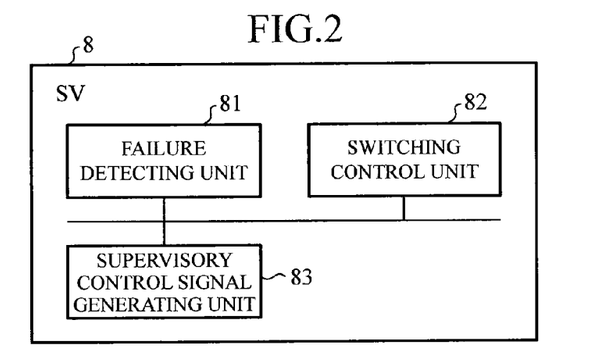
FIG. 2 is a diagram showing the structure of a transmit side supervisory control unit in accordance with Embodiment 1 of the present invention.

The transmit side supervisory control unit 8 supervises the state of each transmission multiplexing transponder 6-1 to 6-N and also carries out selection switching control on each of the N×1 optical switches 5-1 to 5-*m*. This transmit side supervisory control unit 8 is comprised of a failure detecting unit 81 for detecting a failure occurring in each of the transmission multiplexing transponders 6-1 to 6-N, a switching control unit 82 for carrying out selection switching control on each of the N×1 optical switches 5-1 to 5-*m* according to the result of the failure detection by the failure detecting unit 81, and a supervisory control signal generating unit 83 for generating a supervisory control signal showing the supervisory control state of the transmit side supervisory control unit 8 and outputting the supervisory control signal to the transmission multiplexing transponder 6-R, as shown in FIG. 2.

On the other hand, the receiver 2 is comprised of a wavelength demultiplexing unit 9, reception multiplexing transponders 10-1 to 10-N, 10-R, and 10-R2, (N+1)×N optical switches (output selecting unit) 11-1 to 11-*m*, and a receive side supervisory control unit (SV) 12, as shown in FIG. 1.

The wavelength demultiplexing unit 9 demultiplexes the wavelength multiplexed light received from the transmitter 1 via the transmission line 3 into the light signals having the wavelengths λ1 to λN and λN+1. The light signals having the wavelengths λ1 to λN and λN+1 into which the wavelength multiplexed light is demultiplexed by this wavelength demultiplexing unit 9 are outputted to the reception multiplexing transponder 10-1 to 10-N and 10-R, respectively.

Each of the reception multiplexing transponders 10-1 to 10-N and 10-R demultiplexes the corresponding light signal from the wavelength demultiplexing unit 9 into m light signals. The reception multiplexing transponder 10-R also detects the supervisory control signal from the light signal inputted thereto, and outputs the supervisory control signal to the receive side supervisory control unit 12 via the reception multiplexing transponder 10-R2. This reception multiplexing transponder 10-R also corresponds to a supervisory control signal detecting unit described in the claimed invention. The reception multiplexing transponders 10-1 to 10-N which use the wavelengths λ1 to λN are operational reception multiplexing transponders for use in normal signal transmission, like the transmission multiplexing transponders 6-1 to 6-N and 6-R. On the other hand, the reception multiplexing transponder 10-R which uses the wavelength λN+1 is a reserve reception multiplexing transponder which constructs a reserve transmission line when a failure occurs in the signal transmission using the wavelengths λ1 to λN. The light signals into which each of the light signals having the wavelengths is demultiplexed by the corresponding one of the reception multiplexing transponders 10-1 to 10-N and 10-R are outputted to the (N+1)×N optical switches 11-1 to 11-*m*, respectively.

Each of the (N+1)×N optical switches 11-1 to 11-*m* selects a light signal, as output light at each output port thereof, from the light signal from the corresponding one of the reception multiplexing transponders 10-1 to 10-N and the light signal from the reception multiplexing transponder 10-R according to control by the receive side supervisory control unit 12. A light signal (1) from the reception multiplexing transponder 10-1, a light signal (1) from the reception multiplexing transponder 10-2, . . . , and a light signal (1) from the reception multiplexing transponder 10-R are inputted to the (N+1)×N optical switch 11-1. More specifically, the light signal from the 1st output port of each of the reception multiplexing transponders 10-1 to 10-N and 10-R is inputted to the (N+1)×N optical switch 11-1. Similarly, a light signal from the mth output port of each of the reception multiplexing transponders 10-1 to 10-N and 10-R is inputted to the (N+1)×N optical switch 11-*m*.

The receive side supervisory control unit 12 carries out selection switching control on each of the (N+1)×N optical switches 11-1 to 11-*m* according to the supervisory control signal from the reception multiplexing transponder 10-R.

Figure 3:
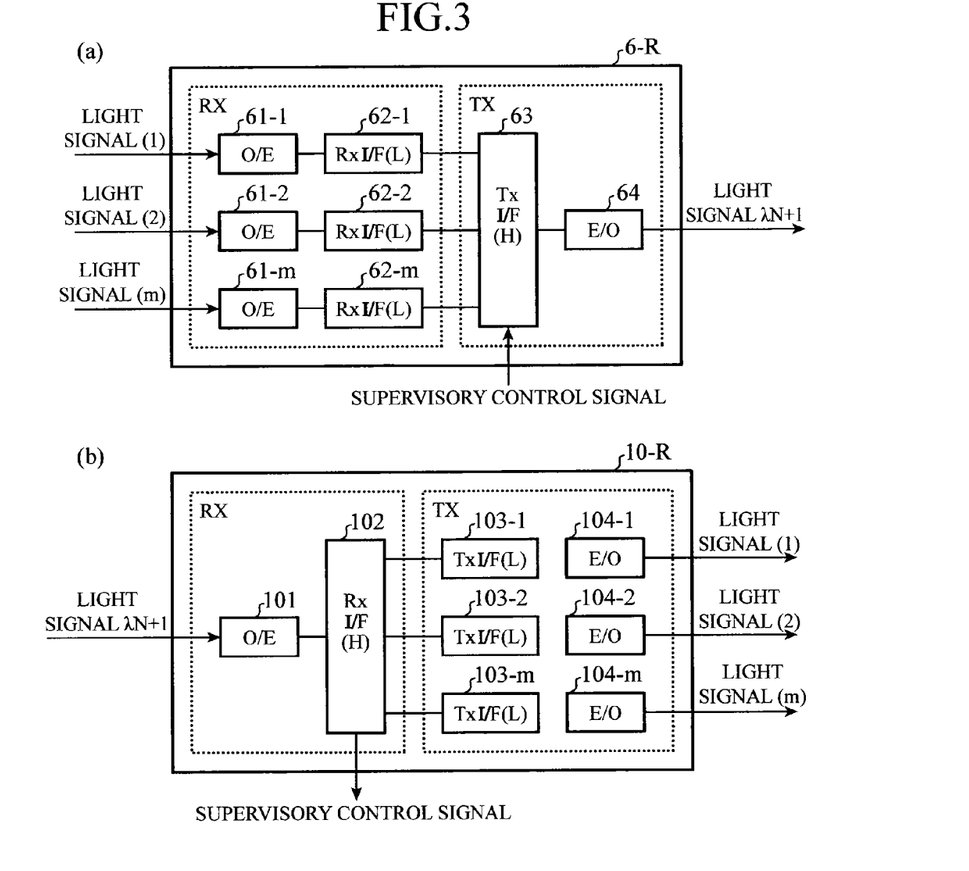
FIG. 3 is a diagram showing the structure of a multiplexing transponder in accordance with Embodiment 1 of the present invention.

Next, the structure of each of the transmission multiplexing transponders 6-1 to 6-N and 6-R and that of each of the reception multiplexing transponders 10-1 to 10-N and 10-R, which are constructed as above, will be explained. FIG. 3 is a diagram showing the structure of each of the multiplexing transponders in accordance with Embodiment 1 of the present invention. The structure of the transmission multiplexing transponder 6-R and that of the reception multiplexing transponder 10-R are shown in FIG. 3. The transmission multiplexing transponder 6-R is comprised of low-speed side optical-to-electrical converters (O/E) 61-1 to 61-*m*, low-speed side received signal processing units (RxI/F(L)) 62-1 to 62-*m*, a high-speed side transmission signal processing unit (TxI/F (H)) 63, and a high-speed side electrical-to-optical converter (E/O) 64, as shown in FIG. 3(*a*).

Each of the O/Es 61-1 to 61-*m* converts a light signal received thereby into an electric signal. The electric signal into which the light signal is converted by each of these O/Es 61-1 to 61-*m* is outputted to the corresponding one of the RxI/F(L)s 62-1 to 62-*m*.

Each of the RxI/F(L)s 62-1 to 62-*m* carries out a frame reception process on the electric signal from the corresponding one of the O/Es 61-1 to 61-*m*. The electric signal on which the frame reception process is carried out by each of these RxI/F(L)s 62-1 to 62-*m* is outputted to the TxI/F(H) 63.

The TxI/F (H) 63 multiplexes the electric signals from the RxI/F(L)s 62-1 to 62-*m* to generate a transmission signal frame. The TxI/F(H) 63 of the transmission multiplexing transponder 6-R further maps the supervisory control signal from the transmit side supervisory control unit 8 into a control signal area of the transmission signal frame generated thereby. The transmission signal frame generated by this TxI/F(H) 63 is outputted to the E/O 64.

The E/O 64 converts the transmission signal frame from the TxI/F(H) 63 into a light signal having a wavelength which is assigned thereto in order that the transmitter can carry out the wavelength multiplexing. The light signal into which the transmission signal frame is converted by this E/O 64 is outputted to the wavelength multiplexing unit 7.

Further, the reception multiplexing transponder 10-R is comprised of a high-speed side optical-to-electrical converter (O/E) 101, a high-speed side received signal processing unit (RxI/F (H)) 102, low-speed side transmission signal processing units (TxI/F (L)) 103-1 to 103-*m*, and low-speed side electrical-to-optical converters (E/O) 104-1 to 104-*m*, as shown in FIG. 3(*b*).

The O/E 101 converts a light signal received thereby into an electric signal. The electric signal into which the light signal is converted by this O/E 101 is outputted to the RxI/F (H) 102.

The RxI/F (H) 102 carries out a frame reception process on the electric signal from the O/E 101, and also demultiplexes the electric signal into m electric signals. The RxI/F (H) 102 of the reception multiplexing transponder 10-R also detects the supervisory control signal from the control signal area of the electric signal in performing the frame reception process, and outputs the supervisory control signal to the receive side supervisory control unit 12. The electric signals into which the electric signal on which the frame reception process is performed is demultiplexed by this RxI/F (H) 102 are outputted to the TxI/F(L)s 103-1 to 103-*m*, respectively.

The TxI/F(L)s 103-1 to 103-*m* process the m electric signals from the RxI/F(H) 102 to generate received signal frames. The received signal frames generated by these TxI/F (L)s 103-1 to 103-*m* are outputted to the E/Os 104-1 to 104-*m*, respectively.

The E/Os 104-1 to 104-*m* convert the signal frames received from the TxI/F(L)s 103-1 to 103-*m* into light signals, respectively. The light signals into which the signal frames are converted by these E/Os 104-1 to 104-*m* are outputted to the (N+1)×N optical switches 11-1 to 11-*m*, respectively.

Each of the other transmission multiplexing transponders 6-1 to 6-N has the same structure as the transmission multiplexing transponder 6-R with the exception that each of the other transmission multiplexing transponders does not carry out the mapping of the supervisory control signal, and each of the reception multiplexing transponders 10-1 to 10-N has the same structure as the reception multiplexing transponder 10-R with the exception that each of the other reception multiplexing transponders does not carry out the detection of the supervisory control signal.

Figure 4:
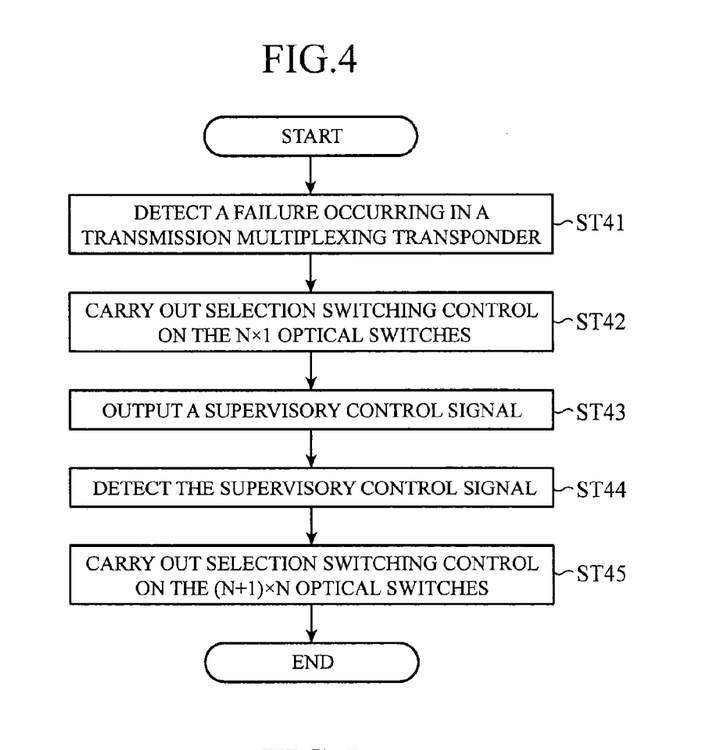
FIG. 4 is a flow chart showing the operation of the wavelength multiplexing optical transmission system in accordance with Embodiment 1 of the present invention when a failure occurs in the wavelength multiplexing optical transmission system.

Next, the operation of the wavelength multiplexing optical transmission system constructed as above will be explained. FIG. 4 is a flow chart showing the operation of the wavelength multiplexing optical transmission system in accordance with Embodiment 1 of the present invention when a failure occurs in the wavelength multiplexing optical transmission system. Hereafter, a case in which a failure occurs in the transmission multiplexing transponder 6-2 and the output of the light signal having the wavelength λ2 is stopped will be explained as an example. In the operation of the wavelength multiplexing optical transmission system, the failure detecting unit 81 detects a failure occurring in the transmission multiplexing transponder 6-2 first (step ST41), as shown in FIG. 4. More specifically, the failure detecting unit 81 always supervises the state of each of the transmission multiplexing transponders 6-1 to 6-N which are operational transmission multiplexing transponders, and detects that a failure occurs in the transmission multiplexing transponder 6-2 and the output of the light signal having the wavelength λ2 is stopped.

The switching control unit 82 then carries out selection switching control on each of the N×1 optical switches 5-1 to 5-*m* (step ST42). More specifically, the switching control unit 82 controls each of the N×1 optical switches 5-1 to 5-*m* to select the light signal which is branched off from the light signal inputted to the transmission multiplexing transponder 6-2 as output light thereof. As a result, the transmission multiplexing transponder 6-R enters a state in which the same light signals (1) to (m) as the m light signals (1) to (m) inputted to the transmission multiplexing transponder 6-2 are inputted thereto. After that, after these light signals (1) to (m) are converted into a light signal having the wavelength λN+1 by the transmission multiplexing transponder 6-R, and wavelength multiplexing is carried out on the light signal together with the other light signals having wavelengths λ1 to λN by the wavelength multiplexing unit 7 to generate a wavelength multiplexed light signal and this wavelength multiplexed light signal is sent out to the receiver 2 via the transmission line 3.

The supervisory control signal generation unit 83 then outputs a supervisory control signal (step ST43). More specifically, the supervisory control signal generation unit generates a supervisory control signal showing the supervisory control state of the local station (showing that a failure occurs in the transmission multiplexing transponder 6-2 and the transmission multiplexing transponder 6-R outputs the light signals on behalf of the transmission multiplexing transponder 6-2), and outputs the supervisory control signal to the transmission multiplexing transponder 6-R. The transmission multiplexing transponder 6-R then multiplexes this supervisory control signal into the light signal having the wavelength λN+1 (maps the supervisory control signal into the control signal area of the transmission signal frame), and outputs this light signal.

The reception multiplexing transponder 10-R then detects the supervisory control signal (step ST44). More specifically, the light signal transmitted from the transmitter 1 via the transmission line 3 is demultiplexed into the light signals having the wavelengths λ1 to λN and λN+1 by the wavelength demultiplexing unit 9. The light signals having the wavelengths λ1 to λN and λN+1 into which the light signal transmitted from the transmitter is demultiplexed are inputted to the reception multiplexing transponders 10-1 to 10-N and 10-R, respectively, and the reception frame process and demultiplexing are carried out on each of the light signals. Light signals into which each of the light signals having the wavelengths is demultiplexed by the corresponding one of the reception multiplexing transponders 10-1 to 10-N and 10-R are outputted to the (N+1)×N optical switches 11-1 to 11-*m*, respectively. At this time, the reception multiplexing transponder 10-R detects the supervisory control signal from the supervisory control area of the light signal having the wavelength λN+1 inputted thereto in performing the frame reception process. The supervisory control signal detected by this reception multiplexing transponder 10-R is outputted to the receive side supervisory control unit 12.

The receive side supervisory control unit 12 then carries out selection switching control on each of the (N+1)×N optical switches 11-1 to 11-*m* (step ST45). More specifically, the receive side supervisory control unit 12 recognizes that a failure has occurred in the transmission multiplexing transponder 6-2 which uses the wavelength λ2, and the same light signal as the light signal having the wavelength λ2 is outputted by the transmission multiplexing transponder 6-R according to the supervisory control signal from the reception multiplexing transponder 10-R. The receive side supervisory control unit then controls the (N+1)×N optical switches 11-1 to 11-*m* to cause them to select the light signals (1) to (m) from the reception multiplexing transponder 10-R as output light thereof, instead of the light signals from the reception multiplexing transponder 10-2 which uses the wavelength λ2. At this time, the receive side supervisory control unit controls the (N+1)×N optical switches to cause them to select the light signals (1) to (m) from each of the other reception multiplexing transponders 11-1 and 11-3 to 11-*m* as output light thereof, just as as they are. As a result, the receiver enters a state in which the receiver outputs the same light signals as the m light signals (1) to (m) from the reception multiplexing transponder 10-2 via the (N+1)×N optical switches 11-1 to 11-*m*.

As mentioned above, even when a failure occurs in an operational transmission multiplexing transponder, the wavelength multiplexing optical transmission system in accordance with this Embodiment 1 can sidestep the failure and transmit a light signal to be transmitted via the operational transmission multiplexing transponder by using the reserve system transmission and reception multiplexing transponders by carrying out selection switching control on the N×1 optical switches 5-1 to 5-*m* and the (N+1)×N optical switches 11-1 to 11-*m*.

Embodiment 2.

Figure 5:
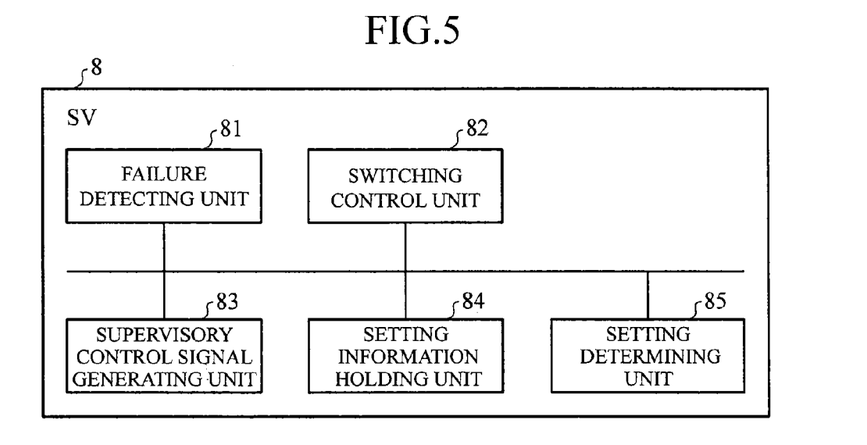
FIG. 5 is a diagram showing the structure of a transmit side supervisory control unit in accordance with Embodiment 2 of the present invention.

Although the case in which a failure occurs in one operational transmission multiplexing transponder is explained in Embodiment 1, a case in which a further failure also occurs in another operational transmission multiplexing transponder will be explained in Embodiment 2. FIG. 5 is a diagram showing the structure of a transmit side supervisory control unit 8 of a wavelength multiplexing optical transmission system in accordance with Embodiment 2 of the present invention. The transmit side supervisory control unit 8 in accordance with Embodiment 2 shown in FIG. 5 includes a setting information holding unit 84 and a setting determining unit 85 in addition to the components of the transmit side supervisory control unit 8 in accordance with Embodiment 1 shown in FIG. 2. The other structural components of the wavelength multiplexing optical transmission system in accordance with Embodiment 2 of the present invention are the same as those in accordance with Embodiment 1 of the present invention, and are designated by the same reference numerals and the explanation of those components will be omitted hereafter.

The setting information holding unit 84 pre-holds setting information about the use or non-use of each of input ports (1) to (m) which each of transmission multiplexing transponders 6-1 to 6-N has. Each setting information held by this setting information holding unit 84 is referred to by the setting determining unit 85. When a failure detecting unit 81 detects a failure occurring in a second operational transmission multiplexing transponder after detection of a failure occurring in a first operational transmission multiplexing transponder, the setting determining unit 85 checks the pieces of setting information held by the setting information holding unit 84 and corresponding to the first and second operational transmission multiplexing transponders. Information showing the result of the check by this setting determining unit 85 is outputted to a switching control unit 82. The switching control unit 82 carries out selection switching control on N×1 optical switches 5-1 to 5-m according to the check result information acquired by the setting determining unit 85.

Figure 6:
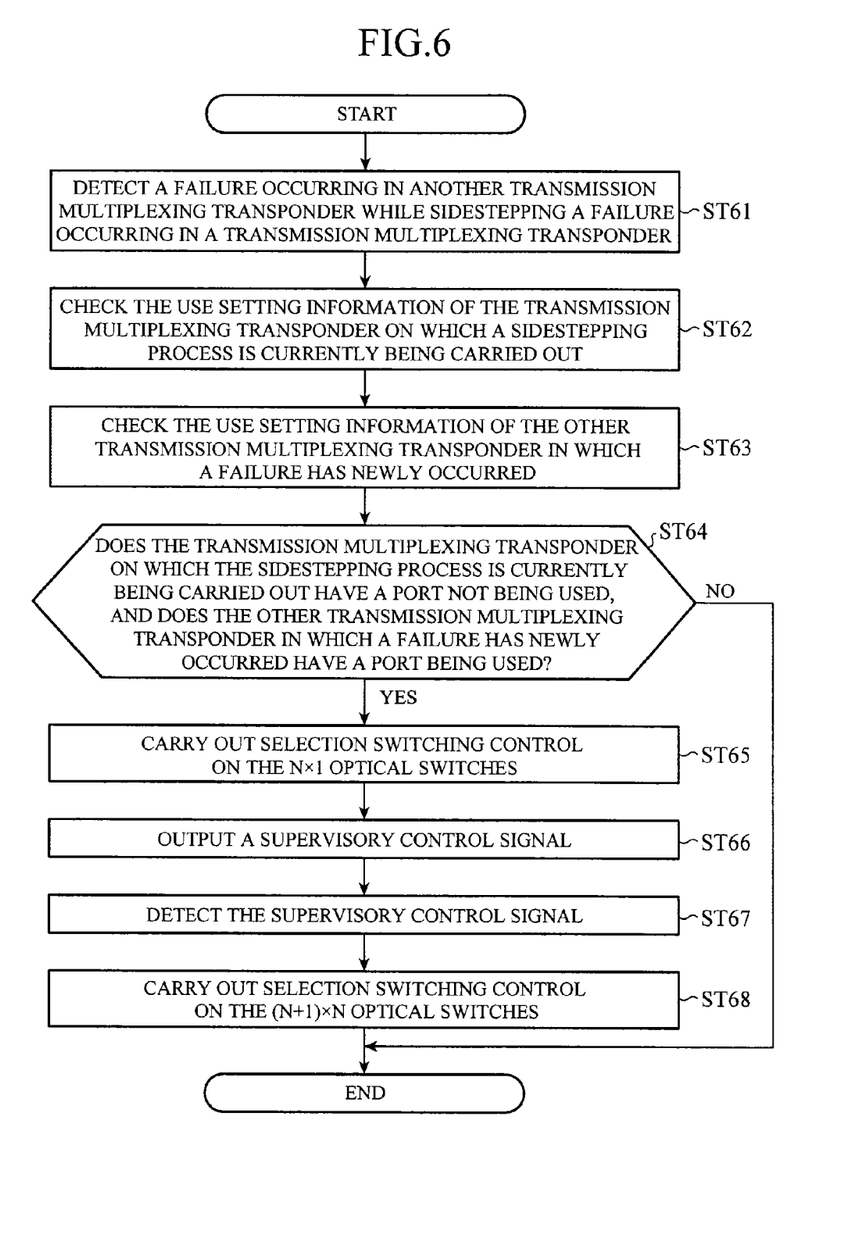
FIG. 6 is a flow chart showing the operation of a wavelength multiplexing optical transmission system in accordance with Embodiment 2 of the present invention when failures occur in plural parts of the wavelength multiplexing optical transmission system.

Next, the operation of the wavelength multiplexing optical transmission system constructed as above will be explained. FIG. 6 is a flow chart showing the operation of the wavelength multiplexing optical transmission system in accordance with Embodiment 2 of the present invention when failures occur in two or more parts of the wavelength multiplexing optical transmission system. Hereafter, a case in which while sidestepping a failure occurring in a transmission multiplexing transponder 6-2 by using a transmission multiplexing transponder 6-R, a failure also occurs in another transmission multiplexing transponder 6-1 will be explained as an example. The setting information holding unit 84 pre-holds the setting information about the use or non-use of each of the input ports (1) to (m) which each of the transmission multiplexing transponders 6-1 to 6-N has.

In the operation of the wavelength multiplexing optical transmission system, the failure detecting unit 81 detects a failure occurring in the other transmission multiplexing transponder 6-1 while sidestepping a failure occurring in the transmission multiplexing transponder 6-2 by using the transmission multiplexing transponder 6-R (step ST61), as shown in FIG. 6.

The setting determining unit 85 then refers to the setting information held by the setting information holding unit 84 to check the use or non-use setting of each of the input ports (1) to (m) which the transmission multiplexing transponder 6-2, on which the failure sidestepping process is currently being carried out, has (step ST62). The setting determining unit 85 then checks the use or non-use setting of each of the input ports (1) to (m) which the transmission multiplexing transponder 6-1 in which a failure has newly occurred by referring to the setting information held by the setting information holding unit 84 (step ST63).

Next, the setting determining unit 85 determines whether the transmission multiplexing transponder 6-2 has an input port (p) set to a non-use state and whether or not a corresponding input port (p) of the transmission multiplexing transponder 6-1 is set to a use state (step ST64).

When the setting determining unit 85, in this step ST64, determines that the transmission multiplexing transponder 6-2 has an input port (p) set to a non-use state and the corresponding input port (p) of the transmission multiplexing transponder 6-1 is set to a use state, the switching control unit 82 carries out selection switching control on an N×1 optical switch 5-p to which a light signal which is made to branch off from a light signal (p) inputted to the input port (p) of each of the transmission multiplexing transponders 6-1 to 6-N is inputted (step ST65). More specifically, the switching control unit 82 controls the N×1 optical switch 5-p to switch from selection of the light signal which is made to branch off from the light signal (p) inputted to the transmission multiplexing transponder 6-2 to selection of the light signal which is made to branch off from the light signal (p) inputted to the transmission multiplexing transponder 6-1.

As a result, the light signal (p) included in the light signals (1) to (m) inputted to the transmission multiplexing transponder 6-R is switched to the same light signal as the light signal (p) inputted to the transmission multiplexing transponder 6-1. The light signals other than the light signal (p) are still the same as the light signals other than the light signal (p) which are inputted to the transmission multiplexing transponder 6-2. After that, after these light signals (1) to (m) are converted into a light signal having a wavelength $\lambda N+1$ by the transmission multiplexing transponder 6-R, and wavelength multiplexing is carried out on the light signal together with the other light signals having wavelengths $\lambda 1$ to $\lambda N$ by a wavelength multiplexing unit 7 to generate a wavelength multiplexed light signal and this wavelength multiplexed light signal is sent out to a receiver 2 via a transmission line 3.

A supervisory control signal generating unit 83 then outputs a supervisory control signal (step ST66). More specifically, the supervisory control signal generation unit generates a supervisory control signal showing the supervisory control state of the local station (showing that a failure also occurs in the transmission multiplexing transponder 6-1 and the transmission multiplexing transponder 6-R outputs the light signal (p) on behalf of the transmission multiplexing transponder 6-1), and outputs the supervisory control signal to the transmission multiplexing transponder 6-R. The transmission multiplexing transponder 6-R then multiplexes the supervisory control signal into the light signal having the wavelength $\lambda N+1$ (maps the supervisory control signal into a control signal area of a transmission signal frame), and outputs this light signal.

A reception multiplexing transponder 10-R then detects the supervisory control signal (step ST67). More specifically, the light signal transmitted from the transmitter 1 via the transmission line 3 is demultiplexed into light signals having wavelengths $\lambda 1$ to $\lambda N$ and $\lambda N+1$ by a wavelength demultiplexing unit 9. The light signals having the wavelengths $\lambda 1$ to $\lambda N$ and $\lambda N+1$ into which the light signal transmitted from the transmitter is demultiplexed are inputted to reception multiplexing transponders 10-1 to 10-N and the reception multiplexing transponder 10-R, respectively, and a reception frame process and demultiplexing are carried out on each of the light signals. Light signals into which each of the light signals having the wavelengths is demultiplexed by the corresponding one of the reception multiplexing transponders 10-1 to 10-N and 10-R are outputted to (N+1)×N optical switches 11-1 to 11-m, respectively. At this time, the reception multiplexing transponder 10-R detects the supervisory control signal from the supervisory control area of the light signal having the wavelength λN+1 inputted thereto in performing a frame reception process. The supervisory control signal detected by this reception multiplexing transponder 10-R is outputted to a receive side supervisory control unit 12.

The receive side supervisory control unit 12 then carries out selection switching control to the (N+1)×N optical switch 11-$p$ (step ST68). More specifically, the receive side supervisory control unit 12 recognizes that a failure also occurs in the transmission multiplexing transponder 6-1 which uses the wavelength λ1, and the same light signal as the light signal having the wavelength λ1 is outputted by the transmission multiplexing transponder 6-R according to the supervisory control signal from the reception multiplexing transponder 10-R. The receive side supervisory control unit then controls the (N+1)×N optical switch 11-$p$ to cause this switch to select the light signal ($p$) from the output port ($p$) of the reception transponder 10-R as output light thereof instead of the light signal ($p$) from the output port ($p$) of the reception multiplexing transponder 10-1. As a result, the wavelength multiplexing optical transmission system maintains the failure sidestepping process on the light signals other than the light signal ($p$) inputted to the input port ($p$) set to a non-use state of the transmission multiplexing transponder 6-2 on which the wavelength multiplexing optical transmission system has been carrying out the failure sidestepping process while carrying out the failure stepping process on the light signal ($p$) of the transmission multiplexing transponder 6-1 in which a failure has newly occurred.

As mentioned above, the wavelength multiplexing optical transmission system in accordance with this Embodiment 2 pre-holds the setting information about the use or non-use of each of the input ports (1) to (m) which each of the transmission multiplexing transponders 6-1 to 6-N has, and, when a failure occurs in another operational transmission multiplexing transponder while sidestepping a failure occurring in an operational transmission multiplexing transponder, carries out selection switching control on the N×1 optical switches 5-1 to 5-$m$ and the (N+1)×N optical switches 11-1 to 11-$m$ in such a way as to stop the failure sidestepping process on the light signal inputted to an input port set to a non-use state of the operational transmission multiplexing transponder on which the failure sidestepping process is currently being carried out, and carry out the failure sidestepping process on the light signal inputted to the other operational transmission multiplexing transponder in which a failure has newly occurred. Therefore, the present embodiment provides an advantage of being able to improve the use efficiency of the wavelengths in addition to the advantage provided by Embodiment 1.

Embodiment 3.

Although the case in which the wavelength multiplexing optical transmission system carries out selection switching control on the optical switches according to the setting information about the use or non-use of each input port which each operation system transponder has is explained in Embodiment 2, a case in which a wavelength multiplexing optical transmission system carries out selection switching control on optical switches according to the priority of each input port which the operation system transponder has will be explained in Embodiment 3. A transmit side supervisory control unit 8 in accordance with Embodiment 3 has the same structure as the transmit side supervisory control unit 8 in accordance with Embodiment 2 shown in FIG. 5, and the structure of the transmit side supervisory control unit 8 in accordance with Embodiment 3 will be explained hereafter with reference to FIG. 5.

A setting information holding unit 84 pre-holds setting information about the priority of each of input ports (1) to (m) which each of transmission multiplexing transponders 6-1 to 6-N has. Each setting information held by this setting information holding unit 84 is referred to by a setting determining unit 85. When a failure detecting unit 81 detects a failure occurring in a second operational transmission multiplexing transponder after detection of a failure occurring in a first operational transmission multiplexing transponder, the setting determining unit 85 checks the pieces of setting information held by the setting information holding unit 84 and corresponding to the first and second operational transmission multiplexing transponders. Information showing the result of the check by this setting determining unit 85 is outputted to a switching control unit 82.

Figure 7:
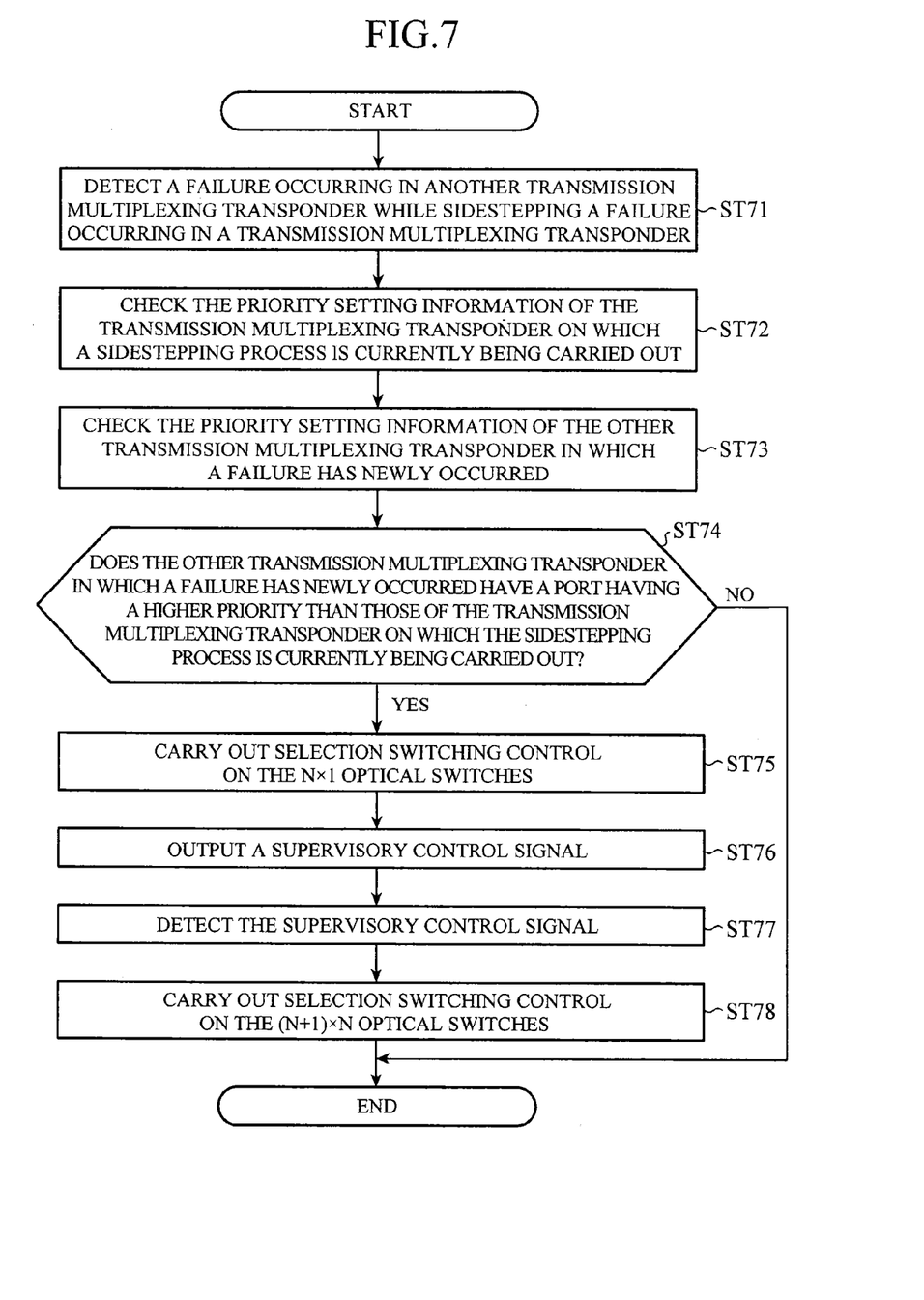
FIG. 7 is a flow chart showing the operation of a wavelength multiplexing optical transmission system in accordance with Embodiment 3 of the present invention when failures occur in plural parts of the wavelength multiplexing optical transmission system.

Next, the operation of the wavelength multiplexing optical transmission system constructed as above will be explained. FIG. 7 is a flow chart showing the operation of the wavelength multiplexing optical transmission system in accordance with Embodiment 3 of the present invention when failures occur in two or more parts of the wavelength multiplexing optical transmission system. Hereafter, a case in which while sidestepping a failure occurring in a transmission multiplexing transponder 6-2 by using a transmission multiplexing transponder 6-R, a failure also occurs in another transmission multiplexing transponder 6-1 will be explained as an example. The setting information holding unit 84 pre-holds the setting information about the priority of each of the input ports (1) to (m) which each of the transmission multiplexing transponders 6-1 to 6-N has.

In the operation of the wavelength multiplexing optical transmission system, the failure detecting unit 81 detects a failure occurring in the other transmission multiplexing transponder 6-1 while sidestepping a failure occurring in the transmission multiplexing transponder 6-2 by using the transmission multiplexing transponder 6-R (step ST71), as shown in FIG. 7.

The setting determining unit 85 then refers to the setting information held by the setting information holding unit 84 to check the priority setting of each of the input ports (1) to (m) which the transmission multiplexing transponder 6-2, on which the failure sidestepping process is currently being carried out, has (step ST72). The setting determining unit 85 then checks the use or non-use setting of each of the input ports (1) to (m) which the transmission multiplexing transponder 6-1 in which a failure has newly occurred by referring to the setting information held by the setting information holding unit 84 (step ST73).

Next, the setting determining unit 85 determines whether the transmission multiplexing transponder 6-1 has an input port ($p$) having a higher priority than a corresponding input port ($p$) of the transmission multiplexing transponder 6-2 (step ST74).

When the setting determining unit 85, in this step ST74, determines that the transmission multiplexing transponder 6-1 has an input port ($p$) having a higher priority than a corresponding input port ($p$) of the transmission multiplexing transponder 6-2, the switching control unit 82 carries out selection switching control on an N×1 optical switch 5-$p$ to which a light signal which is made to branch off from a light signal ($p$) inputted to the input port ($p$) of each of the transmission multiplexing transponders 6-1 to 6-N is inputted (step ST75). More specifically, the switching control unit 82 controls the N×1 optical switch 5-$p$ to switch from selection of the light signal which is made to branch off from the light signal (p) inputted to the transmission multiplexing transponder 6-2 to selection of the light signal which is made to branch off from the light signal (p) inputted to the transmission multiplexing transponder 6-1.

As a result, the light signal (p) included in the light signals (1) to (m) inputted to the transmission multiplexing transponder 6-R is switched to the same light signal as the light signal (p) inputted to the transmission multiplexing transponder 6-1. The light signals other than the light signal (p) are still the same as the light signals other than the light signal (p) which are inputted to the transmission multiplexing transponder 6-2. After that, after these light signals (1) to (m) are converted into a light signal having a wavelength λN+1 by the transmission multiplexing transponder 6-R, and wavelength multiplexing is carried out on the light signal together with the other light signals having wavelengths λ1 to λN by a wavelength multiplexing unit 7 to generate a wavelength multiplexed light signal and this wavelength multiplexed light signal is sent out to a receiver 2 via a transmission line 3.

A supervisory control signal generating unit 83 then outputs a supervisory control signal (step ST76). More specifically, the supervisory control signal generation unit generates a supervisory control signal showing the supervisory control state of the local station (showing that a failure also occurs in the transmission multiplexing transponder 6-1 and the transmission multiplexing transponder 6-R outputs the light signal (p) on behalf of the transmission multiplexing transponder 6-1), and outputs the supervisory control signal to the transmission multiplexing transponder 6-R. The transmission multiplexing transponder 6-R then multiplexes the supervisory control signal into the light signal having the wavelength λN+1 (maps the supervisory control signal into a control signal area of a transmission signal frame), and outputs this light signal.

A reception multiplexing transponder 10-R then detects the supervisory control signal (step ST77). More specifically, the light signal transmitted from the transmitter 1 via the transmission line 3 is demultiplexed into light signals having wavelengths λ1 to λN and λN+1 by a wavelength demultiplexing unit 9. The light signals having the wavelengths λ1 to λN and λN+1 into which the light signal transmitted from the transmitter is demultiplexed are inputted to reception multiplexing transponders 10-1 to 10-N and the reception multiplexing transponder 10-R, respectively, and a reception frame process and demultiplexing are carried out on each of the light signals. Light signals into which each of the light signals having the wavelengths is demultiplexed by the corresponding one of the reception multiplexing transponders 10-1 to 10-N and 10-R are outputted to (N+1)×N optical switches 11-1 to 11-m, respectively. At this time, the reception multiplexing transponder 10-R detects the supervisory control signal from the supervisory control area of the light signal having the wavelength λN+1 inputted thereto in performing a frame reception process. The supervisory control signal detected by this reception multiplexing transponder 10-R is outputted to a receive side supervisory control unit 12.

The receive side supervisory control unit 12 then carries out selection switching control to the (N+1)×N optical switch 11-p (step ST78). More specifically, the receive side supervisory control unit 12 recognizes that a failure also occurs in the transmission multiplexing transponder 6-1 which uses the wavelength λ1, and the same light signal as the light signal having the wavelength λ1 is outputted by the transmission multiplexing transponder 6-R according to the supervisory control signal from the reception multiplexing transponder 10-R. The receive side supervisory control unit then controls the (N+1)×N optical switch 11-p to cause this switch to select the light signal (p) from the output port (p) of the reception transponder 10-R as output light thereof instead of the light signal (p) from the output port (p) of the reception multiplexing transponder 10-1. As a result, the wavelength multiplexing optical transmission system maintains the failure sidestepping process on the light signals other than the light signal (p) of the transmission multiplexing transponder 6-2 on which the wavelength multiplexing optical transmission system has been carrying out the failure sidestepping process while carrying out the failure stepping process on the light signal (p) of the transmission multiplexing transponder 2-1 in which a failure has newly occurred, the light signal having a higher priority than that of the transmission multiplexing transponder 6-2.

As mentioned above, the wavelength multiplexing optical transmission system in accordance with this Embodiment 3 pre-holds the setting information about the priority of each of the input ports (1) to (m) which each of the transmission multiplexing transponders 6-1 to 6-N has, and, when a failure occurs in another operational transmission multiplexing transponder while sidestepping a failure occurring in an operational transmission multiplexing transponder, carries out selection switching control on the N×1 optical switches 5-1 to 5-m and the (N+1)×N optical switches 11-1 to 11-m in such a way as to carry out the failure sidestepping process on the light signals inputted to the input ports of the higher-priority one of the two operational transmission multiplexing transponders. Therefore, the present embodiment provides an advantage of being able to improve the use efficiency of the wavelengths in addition to the advantage provided by Embodiment 1. Further, the wavelength multiplexing optical transmission system can sidestep a failure occurring in light signals having the highest priority at all times, and can make a fine failure management setting.

Figure 8:
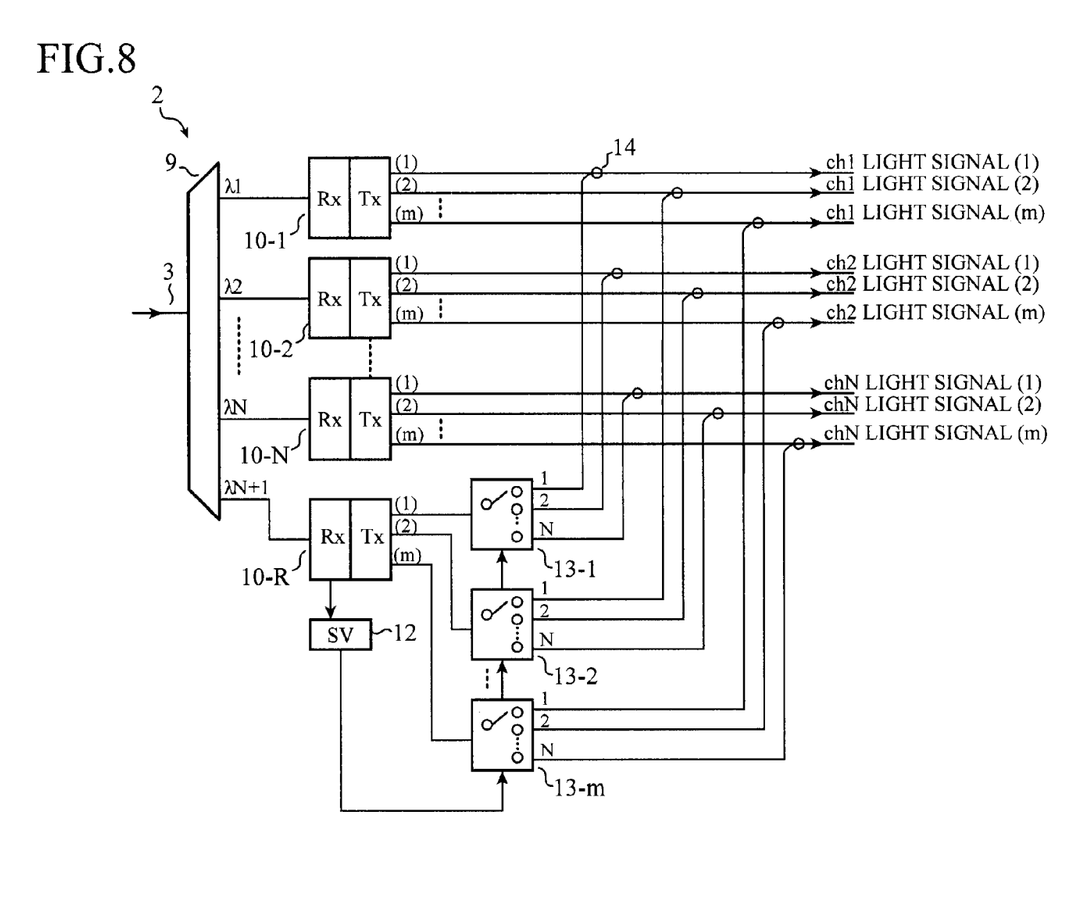
FIG. 8 is a diagram showing another example of the structure of a receiver in accordance with any of Embodiments 1 to 3 of the present invention.

Although the case in which the receiver 2 uses the (N+1)×N optical switches 11-1 to 11-m, as shown in FIG. 1, is shown in Embodiments 1 to 3, the receiver 2 can be constructed in such a way as to use 1×N optical switches 13-1 to 13-m each of which selects the destination of output of a light signal inputted thereto from the reception multiplexing transponder 10-R according to control by a receive side supervisory control unit 12, and optical couplers 14 each of which combines a light signal from a one of the 1×N optical switches 13-1 to 13-m with a light signal from a corresponding one of the reception multiplexing transponders 10-1 to 10-N, as shown in FIG. 8. In this case, the same advantages can be provided.

Further, although the example in which the control state signal is mapped into the control signal area of a transmission frame which is generated by the transmission multiplexing transponder 6-R and is transferred to the receive side supervisory control unit 12, as a means for notifying the control state signal from the transmit side supervisory control unit 8 to the receive side supervisory control unit 12, is shown in Embodiments 1 to 3, a means for independently converting the control state signal into a light signal using a wavelength other than the wavelengths λ1 to λN+1, and wavelength-multiplexing the light signal into a light signal to be sent out to the transmission line 3 can be alternatively used. In this case, the same advantages can be provided.

Further, in Embodiments 1 to 3, in order to further improve the convenience of dealing with a failure, the transmit side supervisory control unit 8 and the receive side supervisory control unit 12 can be constructed in such a way as to be able to forcefully and arbitrarily select the target for failure sidestepping. While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the wavelength multiplexing optical transmission system, the transmitter, and the receiver in accordance with the present invention can sidestep a failure and ensure the signal transmission even when using a multiplexing transponder that accommodates a plurality of signals with a single transponder, they can be applied to a transmission system for optical communications using a wavelength multiplexing method and are suitable for use as a wavelength multiplexing optical transmission system, a transmitter, and a receiver which improve the reliability when a failure occurs in the system, and so on.

EXPLANATIONS OF REFERENCE NUMERALS 1 transmitter, 2 receiver, 3 transmission line, 4 optical coupler, 5-1 to 5-$m$ N×1 optical switch (input selecting unit), 6-1 to 6-N and 6-R transmission multiplexing transponder, 7 wavelength multiplexing unit, 8 transmit side supervisory control unit, 9 wavelength demultiplexing unit, 10-1 to 10-N, 10-R, and 10-R2 reception multiplexing transponder, 11-1 to 11-$m$ (N+1)×N optical switch (output selecting unit), 12 receive side supervisory control unit, 13-1 to 13-$m$ 1×N optical switch, optical coupler, 61-1 to 61-$m$ low-speed side optical-to-electrical converter (O/E), 62-1 to 62-$m$ low-speed side received signal processing unit (RxI/F(L)), 63 high-speed side transmission signal processing unit (TxI/F(H)), 64 high-speed side electrical-to-optical converter (E/O), 81 failure detecting unit, 82 switching control unit, 83 supervisory control signal generating unit, 84 setting information holding unit, 85 setting determining unit, 101 high-speed side optical-to-electrical converter (O/E), 102 high-speed side received signal processing unit (RxI/F(H)), 103-1 to 103-$m$ low-speed side transmission signal processing unit (TxI/F(L)), 104-1 to 104-$m$ low-speed side electrical-to-optical converter (E/O).

The invention claimed is:

1. A wavelength multiplexing optical transmission system including a transmitter for multiplexing a predetermined number of light signals into wavelength-multiplexed light and carrying out wavelength conversion on said wavelength-multiplexed light, and a receiver for demultiplexing the wavelength-multiplexed light from said transmitter into the predetermined number of light signals, wherein said transmitter includes:
a plurality of operational transmission multiplexing transponders each for multiplexing a predetermined number of light signals inputted thereto into a light signal and converting this light signal into a light signal having a specific wavelength; an input selecting unit for selecting one light signal from light signals respectively inputted to each group of corresponding input ports of said plurality of operational transmission multiplexing transponders as output light thereof;
a reserve transmission multiplexing transponder for multiplexing light signals selected by said input selecting unit into a light signal and converting this light signal into a light signal having a wavelength different from those of light signals from said plurality of operational transmission multiplexing transponders;
a wavelength multiplexing unit for wavelength-multiplexing the multiplexed light signals having different wavelengths which are generated by said plurality of operational transmission multiplexing transponders and said reserve transmission multiplexing transponder into a wavelength multiplexed light signal, and outputting this wavelength multiplexed light signal to said receiver;
a transmit side supervisory control unit having a failure detecting unit for detecting a failure occurring in said plurality of operational transmission multiplexing transponders, and a switching control unit for carrying out selection switching control on said input selecting unit according to a result of the failure detection by said failure detecting unit; and
a supervisory control signal output unit for outputting a signal showing a supervisory control state of said transmit side supervisory control unit to said receiver,
and said receiver includes:
a wavelength demultiplexing unit for demultiplexing the wavelength multiplexed light from said wavelength multiplexing unit into light signals having different wavelengths;
a plurality of operational reception multiplexing transponders each for demultiplexing a corresponding one of said light signals into which the wavelength multiplexed light is demultiplexed by said wavelength demultiplexing unit into a predetermined number of light signals;
a reserve reception multiplexing transponder for demultiplexing a corresponding one of said light signals into which the wavelength multiplexed light is demultiplexed by said wavelength demultiplexing unit into a predetermined number of light signals;
an output selecting unit for selecting a light signal from each group of light signals which are respectively demultiplexed by each of said plurality of operational reception multiplexing transponders and said reserve reception multiplexing transponder as output light thereof;
a supervisory control signal detecting unit for detecting the supervisory control signal from said supervisory control signal output unit; and
a receive side supervisory control unit for carrying out selection switching control on said output selecting unit according to the supervisory control signal detected by said supervisory control signal detection unit.

2. The wavelength multiplexing optical transmission system according to claim 1, wherein when said failure detecting unit detects that a failure occurs in an operational transmission multiplexing transponder, said switching control unit causes said input selecting unit to select each of the light signals inputted to said operational transmission multiplexing transponder as output light thereof, and said receive side supervisory control unit causes said output selecting unit to select each of the light signals from said reserve reception multiplexing transponder, instead of each of the light signals from one of said operational reception multiplexing transponders corresponding to said operational transmission multiplexing transponder, as output light thereof.

3. The wavelength multiplexing optical transmission system according to claim 2, wherein said transmit side supervisory control unit further includes a setting information holding unit for holding setting information about use or non-use of each of input ports which each of said plurality of operational transmission multiplexing transponders has, and a setting determining unit for, when said failure detecting unit detects a failure occurring in a second operational transmission multiplexing transponder after detection of a failure occurring in a first operational transmission multiplexing transponder, compares the setting information corresponding to said first operational transmission multiplexing transponder and the setting information corresponding to said second operational transmission multiplexing transponder, which are held by said setting information holding unit, with each other, and wherein when said setting determining unit determines that said first operational transmission multiplexing transponder has an input port set to a non-use state and a corresponding input port of said second operational transmission multiplexing transponder is set to a use state, said switching control unit causes said input selecting unit to switch selection of output light thereof from a light signal inputted to said port set to a non-use state to a light signal inputted to said port set to a use state, and said receive side supervisory control unit causes said output selecting unit to switch to selection of a light signal from an output port of said reserve reception multiplexing transponder corresponding to said port set to a non-use state, instead of a light signal from an output port of an operational reception multiplexing transponder corresponding to said port set to a use state, as output light thereof.

4. The wavelength multiplexing optical transmission system according to claim 2, wherein said transmit side supervisory control unit further includes a setting information holding unit for holding setting information about priority of each of input ports which each of said plurality of operational transmission multiplexing transponders has, and a setting determining unit for, when said failure detecting unit detects a failure occurring in a second operational transmission multiplexing transponder after detection of a failure occurring in a first operational transmission multiplexing transponder, compares the setting information corresponding to said first operational transmission multiplexing transponder and the setting information corresponding to said second operational transmission multiplexing transponder, which are held by said setting information holding unit, with each other, and wherein when said setting determining unit determines that input ports of said second operational transmission multiplexing transponder have a higher priority than those of corresponding input ports of said first operational transmission multiplexing transponder, said switching control unit causes said input selecting unit to switch selection of output light thereof from light signals inputted to the input ports of said first operational transmission multiplexing transponder to light signals inputted to the input ports of said second operational transmission multiplexing transponder, and said receive side supervisory control unit causes said output selecting unit to switch to selection of light signals from output ports of said reserve reception multiplexing transponder corresponding to the input ports of said first operational transmission multiplexing transponder, instead of light signals from output ports of an operational reception multiplexing transponder corresponding to the input ports of said second operational transmission multiplexing transponder, as output light thereof.

5. A transmitter for multiplexing a predetermined number of light signals into a light signal and for carrying out wavelength conversion on this light signal, said transmitter comprising:
  a plurality of operational transmission multiplexing transponders each for multiplexing a predetermined number of light signals inputted thereto into a light signal and converting this light signal into a light signal having a specific wavelength;
  an input selecting unit for selecting one light signal from light signals respectively inputted to each group of corresponding input ports of said plurality of operational transmission multiplexing transponders as output light thereof;
  a reserve transmission multiplexing transponder for multiplexing light signals selected by said input selecting unit into a light signal and converting this light signal into a light signal having a wavelength different from those of light signals from said plurality of operational transmission multiplexing transponders;
  a wavelength multiplexing unit for wavelength-multiplexing the multiplexed light signals having different wavelengths which are generated by said plurality of operational transmission multiplexing transponders and said reserve transmission multiplexing transponder into a wavelength multiplexed light signal, and outputting this light signal;
  a transmit side supervisory control unit having a failure detecting unit for detecting a failure occurring in said plurality of operational transmission multiplexing transponders, and a switching control unit for carrying out selection switching control on said input selecting unit according to a result of the failure detection by said failure detecting unit; and
  a supervisory control signal output unit for outputting a signal showing a supervisory control state of said transmit side supervisory control unit.

6. The transmitter according to claim 5, wherein when said failure detecting unit detects that a failure occurs in an operational transmission multiplexing transponder, said switching control unit causes said input selecting unit to select each of the light signals inputted to said operational transmission multiplexing transponder as output light thereof.

7. The transmitter according to claim 6, wherein said transmit side supervisory control unit further includes a setting information holding unit for holding setting information about use or non-use of each of input ports which each of said plurality of operational transmission multiplexing transponders has, and a setting determining unit for, when said failure detecting unit detects a failure occurring in a second operational transmission multiplexing transponder after detection of a failure occurring in a first operational transmission multiplexing transponder, compares the setting information corresponding to said first operational transmission multiplexing transponder and the setting information corresponding to said second operational transmission multiplexing transponder, which are held by said setting information holding unit, with each other, and wherein when said setting determining unit determines that said first operational transmission multiplexing transponder has an input port set to a non-use state and a corresponding input port of said second operational transmission multiplexing transponder is set to a use state, said switching control unit causes said input selecting unit to switch selection of output light thereof from a light signal inputted to said port set to a non-use state to a light signal inputted to said port set to a use state.

8. The transmitter according to claim 6, wherein said transmit side supervisory control unit further includes a setting information holding unit for holding setting information about priority of each of input ports which each of said plurality of operational transmission multiplexing transponders has, and a setting determining unit for, when said failure detecting unit detects a failure occurring in a second operational transmission multiplexing transponder after detection of a failure occurring in a first operational transmission multiplexing transponder, compares the setting information corresponding to said first operational transmission multiplexing transponder and the setting information corresponding to said second operational transmission multiplexing transponder, which are held by said setting information holding unit, with each other, and wherein when said setting determining unit determines that input ports of said second operational transmission multiplexing transponder have a higher priority than those of corresponding input ports of said first operational transmission multiplexing transponder, said switching control unit causes said input selecting unit to switch selection of output light thereof from light signals inputted to the input ports of said first operational transmission multiplexing transponder to light signals inputted to the input ports of said second operational transmission multiplexing transponder.

9. A receiver for receiving a wavelength multiplexed light into which a predetermined number of light signals are multiplexed and on which wavelength conversion is carried out, and demultiplexing the wavelength multiplexed light into the predetermined number of light signals, said receiver comprising:
- a wavelength demultiplexing unit for demultiplexing wavelength multiplexed light received into light signals having different wavelengths;
- a plurality of operational reception multiplexing transponders each for demultiplexing a corresponding one of said light signals into which the wavelength multiplexed light is demultiplexed by said wavelength demultiplexing unit into a predetermined number of light signals;
- a reserve reception multiplexing transponder for demultiplexing a corresponding one of said light signals into which the wavelength multiplexed light is demultiplexed by said wavelength demultiplexing unit into a predetermined number of light signals;
- an output selecting unit for selecting a light signal from each group of light signals which are respectively demultiplexed by each of said plurality of operational reception multiplexing transponders and said reserve reception multiplexing transponder as output light thereof;
- a supervisory control signal detecting unit for detecting a supervisory control signal showing an input light signal to a reserve transmission multiplexing transponder corresponding to said reserve reception multiplexing transponder, the supervisory control signal being based on a result of detection of a failure occurring in operational transmission multiplexing transponders corresponding to said operational reception multiplexing transponders; and
- a receive side supervisory control unit for carrying out selection switching control on said output selecting unit according to the supervisory control signal detected by said supervisory control signal detecting unit.

10. The receiver according to claim 9, wherein when said supervisory control signal detecting unit detects information showing that light signals inputted to one of said operational transmission multiplexing transponders are inputted to said reserve transmission multiplexing transponder, said receive side supervisory control unit causes said output selecting unit to select the light signals from said reserve reception multiplexing transponder, instead of light signals from one of said operational reception multiplexing transponders corresponding to said operational transmission multiplexing transponder, as output light thereof.

11. The receiver according to claim 10, wherein when said supervisory control signal detecting unit detects information showing that a light signal to a certain input port of said reserve transmission multiplexing transponder is switched from a light signal inputted to a corresponding input port of a first operational transmission multiplexing transponder to a light signal inputted to a corresponding input port of a second operational transmission multiplexing transponder, said receive side supervisory control unit causes said output selecting unit to switch to selection of a light signal from an output port of said reserve reception multiplexing transponder corresponding to the input port of said first operational transmission multiplexing transponder, instead of a light signal from an output port of one of said operational reception multiplexing transponders corresponding to the input port of said second operational transmission multiplexing transponder, as output light thereof.

* * * * *